US010504281B2

(12) United States Patent
Nevraev et al.

(10) Patent No.: US 10,504,281 B2
(45) Date of Patent: Dec. 10, 2019

(54) TRACKING PIXEL LINEAGE IN VARIABLE RATE SHADING

(71) Applicant: Microsoft Technology Licensing, LLC, Redmond, WA (US)

(72) Inventors: Ivan Nevraev, Redmond, WA (US); Martin J. I. Fuller, Warwick (GB); Mark S. Grossman, Palo Alto, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 68 days.

(21) Appl. No.: 15/638,865

(22) Filed: Jun. 30, 2017

(65) Prior Publication Data

US 2019/0005712 A1     Jan. 3, 2019

(51) Int. Cl.
*G06T 15/80* (2011.01)
*G11B 27/34* (2006.01)
*G06T 15/00* (2011.01)
*G06T 11/40* (2006.01)
*G06T 15/60* (2006.01)

(52) U.S. Cl.
CPC .......... *G06T 15/80* (2013.01); *G06T 11/40* (2013.01); *G06T 15/005* (2013.01); *G06T 15/60* (2013.01); *G11B 27/34* (2013.01)

(58) Field of Classification Search
None
See application file for complete search history.

(56) References Cited

U.S. PATENT DOCUMENTS

| 9,305,324 | B2 | 4/2016 | McGuire et al. | |
| 9,401,046 | B2 | 7/2016 | Munkberg et al. | |
| 9,569,886 | B2 | 2/2017 | Akenine-Moller et al. | |
| 2015/0022537 | A1 | 1/2015 | Lum et al. | |
| 2015/0287231 | A1* | 10/2015 | Berghoff | G06T 15/005 345/422 |
| 2015/0373340 | A1* | 12/2015 | Zou | H04N 19/176 375/240.24 |
| 2016/0284119 | A1 | 9/2016 | Surti et al. | |
| 2017/0124757 | A1 | 5/2017 | Sathe et al. | |
| 2017/0293995 | A1* | 10/2017 | Saleh | G06T 1/20 |
| 2018/0286115 | A1* | 10/2018 | Surti | G06T 15/80 |

OTHER PUBLICATIONS

Ragan-Kelley, et al., "Decoupled Sampling for Graphics Pipelines", In Journal of ACM Transactions on Graphics, vol. 30, Issue 3, May 2011, pp. 1-17.
He, et al., "Extending the Graphics Pipeline with Adaptive, Multi-Rate Shading", In Journal of ACM Transactions on Graphics, vol. 33, No. 4, Jul. 2014, 12 pages.
U.S. Appl. No. 62/460,496, Gould, et al., "Variable Rate Shading", filed Feb. 17, 2017, 60 pages.

* cited by examiner

*Primary Examiner* — YuJang Tswei
(74) *Attorney, Agent, or Firm* — Arent Fox LLP

(57) ABSTRACT

Methods and devices for performing variable rate shading are described. Invocation information and lineage information for each pixel of a plurality of pixels of a primitive are stored in an invocation buffer and a lineage buffer of a graphics processing unit. One or more deferred shading or post-processing operations are performed on the image based at least in part on the invocation information and the lineage information associated with each pixel of the plurality of pixels.

22 Claims, 7 Drawing Sheets

Anchor Pixels = Pixel₀ and Pixel₂
Broadcast Pixels = Pixel₁ and Pixel₃

Anchor Pixels = Pixel₀ and Pixel₂
Broadcast Pixel = Pixel₁
Orphan Pixel = Pixel₃

TRACKING PIXEL LINEAGE IN VARIABLE RATE SHADING

BACKGROUND

The present examples relate to a computer device, and more particularly, to performing variable rate shading in rendering graphics on a computer device.

Computer graphics systems, which can render 2D objects or objects from a 3D world (real or imaginary) onto a two-dimensional (2D) display screen, are currently used in a wide variety of applications. For example, 3D computer graphics can be used for real-time interactive applications, such as video games, virtual reality, scientific research, etc., as well as off-line applications, such as the creation of high resolution movies, graphic art, etc. Typically, the graphics system includes a graphics processing unit (GPU). A GPU may be implemented as a co-processor component to a central processing unit (CPU) of the computer, and may be provided in the form of an add-in card (e.g., video card), co-processor, or as functionality that is integrated directly into the motherboard of the computer or into other devices, such as a gaming device.

Typically, the GPU has a "logical graphics pipeline," which may accept as input some representation of a 2D or 3D scene and output a bitmap that defines a 2D image for display. For example, the DIRECTX collection of application programming interfaces by MICROSOFT CORPORATION, including the DIRECT3D API, is an example of APIs that have graphic pipeline models. Another example includes the Open Graphics Library (OPENGL) API. The graphics pipeline typically includes a number of stages to convert a group of vertices, textures, buffers, and state information into an image frame on the screen. For instance, one of the stages of the graphics pipeline is a shader. A shader is a piece of code running on a specialized processing unit, also referred to as a shader unit or shader processor, usually executing multiple data threads at once, programmed to generate appropriate levels of color and/or special effects to fragments being rendered. In particular, for example, a vertex shader processes traits (position, texture coordinates, color, etc.) of a vertex, and a pixel shader processes traits (texture values, color, z-depth and alpha value) of a pixel.

In variable rate shading or other sparse rendering techniques (e.g., checkerboard rendering), a pixel of a primitive may be written by the pixel shader, such pixel referred to as an anchor pixel, or may be a copy of a written pixel, referred to as a broadcast pixel. Further, in variable rate shading, during subsequent rendering of another primitive, the anchor pixel may be overwritten, which results in the broadcast pixel being orphaned. The existing mechanisms, such as in checkerboard rendering, may track pixels and coverage by loading and comparing multiple 32 bit per pixel identification (ID) values which are inefficient. Therefore, there is a desire for improvements in graphics rendering.

SUMMARY

The following presents a simplified summary of one or more examples in order to provide a basic understanding of such examples. This summary is not an extensive overview of all contemplated examples, and is intended to neither identify key or critical elements of all examples nor delineate the scope of any or all examples. Its sole purpose is to present some concepts of one or more examples in a simplified form as a prelude to the more detailed description that is presented later.

One example relates to a method for performing pixel shading in graphics processing. The method includes rasterizing, by a graphics processing unit (GPU), a primitive of an image based on one or more corresponding shading rates, wherein the primitive includes a plurality of pixels, wherein the rasterizing generates metadata that indicates whether each pixel is an anchor pixel, a broadcast pixel, or an orphan pixel, wherein each anchor pixel is a pixel for which a pixel shader was previously invoked, wherein each broadcast pixel has shading copied from a referenced anchor pixel, and wherein each orphan pixel has a previously referenced anchor pixel overwritten; storing, by the GPU, invocation information for each pixel of the plurality of pixels in an invocation buffer and lineage information for each pixel of the plurality of pixels in a lineage buffer, wherein the invocation information indicates whether the respective pixel is the anchor pixel, wherein the lineage information indicates whether the respective pixel is the broadcast pixel, and wherein a combination of the invocation information and the lineage information indicates whether the respective pixel is the orphan pixel; and performing one or more deferred shading or post-processing operations on the image based at least in part on the invocation information and the lineage information associated with each pixel of the plurality of pixels.

In another example, a computer device includes a memory and a GPU in communication with the memory. The GPU is configured to rasterize, by a graphics processing unit (GPU), a primitive of an image based on one or more corresponding shading rates, wherein the primitive includes a plurality of pixels, wherein the rasterizing generates metadata that indicates whether each pixel is an anchor pixel, a broadcast pixel, or an orphan pixel, wherein each anchor pixel is a pixel for which a pixel shader was previously invoked, wherein each broadcast pixel has shading copied from a referenced anchor pixel, and wherein each orphan pixel has a previously referenced anchor pixel overwritten; store, by the GPU, invocation information for each pixel of the plurality of pixels in an invocation buffer and lineage information for each pixel of the plurality of pixels in a lineage buffer, wherein the invocation information indicates whether the respective pixel is the anchor pixel, wherein the lineage information indicates whether the respective pixel is the broadcast pixel, and wherein a combination of the invocation information and the lineage information indicates whether the respective pixel is the orphan pixel; and perform one or more deferred shading or post-processing operations on the image based at least in part on the invocation information and the lineage information associated with each pixel of the plurality of pixels.

In a further example, a computer-readable medium storing computer-executable instructions executable by a processor for variable rate shading in a computer device includes various instructions. The computer-readable medium includes instructions for instructions for rasterizing, by a graphics processing unit (GPU), a primitive of an image based on one or more corresponding shading rates, wherein the primitive includes a plurality of pixels, wherein the rasterizing generates metadata that indicates whether each pixel is an anchor pixel, a broadcast pixel, or an orphan pixel, wherein each anchor pixel is a pixel for which a pixel shader was previously invoked, wherein each broadcast pixel has shading copied from a referenced anchor pixel, and wherein each orphan pixel has a previously referenced anchor pixel overwritten; instructions for storing, by the GPU, invocation information for each pixel of the plurality of pixels in an invocation buffer and lineage information for each pixel of the plurality of pixels in a lineage buffer, wherein the invocation information indicates whether the respective pixel is the anchor pixel, wherein the lineage information indicates whether the respective pixel is the broadcast pixel, and wherein a combination of the invocation information and the lineage information indicates whether the respective pixel is the orphan pixel; and instructions for performing one or more deferred shading or post-processing operations on the image based at least in part on the invocation information and the lineage information associated with each pixel of the plurality of pixels.

Additional advantages and novel features relating to examples of the present invention will be set forth in part in the description that follows, and in part will become more apparent to those skilled in the art upon examination of the following or upon learning by practice thereof.

DETAILED DESCRIPTION

The described solutions provide a graphical processing unit (GPU) that implements variable rate shading, or any other sparse rendering technique (e.g., checkerboard rendering), with an efficient mechanism for tracking a state of each pixel in an image. For example, the state of a pixel may be one of: an anchor pixel (or anchor), which is a pixel written by a pixel shader; a broadcast pixel (or broadcast), which is a copy of another pixel written by the pixel shader; or, an orphan pixel (or orphan), which was previously a broadcast pixel until its anchor was overwritten. In particular, the described devices and methods generate and maintain an invocation buffer and a lineage buffer for tracking the state of pixels, and these buffers may be used by the GPU in shading and post-processing images. The invocation buffer identifies for each pixel whether the pixel shader was invoked at that location the last time the pixel was covered. The lineage buffer defines a pointer for each pixel, where the pointer may point to another pixel from which the pixel is copied (e.g., in the case where the pixel is a broadcast pixel), or where the pointer points to the pixel itself (referred to as "point self" where the pixel is an anchor or orphan pixel). The GPU uses the invocation and the lineage buffers to efficiently identify the minimum number of pixels to shade, e.g., only anchor pixels and orphan pixels, while saving shading-related resources (processing, memory, power) by copying the shading result from an anchor pixel to a corresponding broadcast pixel. Further, the GPU may use the invocation and the lineage buffers in one or more post-processing operations (e.g., temporal anti-aliasing, deferred rendering operations, such as deferred lighting, etc.) to efficiently and perfectly reconstruct coverage in a single copy operation, for example, by using the lineage buffer to create broadcast copies after the deferred passes and/or post processing passes have been completed. Additionally, the GPU may use the invocation and the lineage buffers to generate weights, based on the tracked pixel states, for use in blending a temporal sample in a temporal anti-aliasing operation. The GPU may also use the invocation and the lineage buffers in the construction of other buffers, e.g., variable rate buffers, including stencil buffers, to accelerate deferred passes, and/or post processing, Thus, the described devices and methods allow the GPU to efficiently track whether a pixel was rendered (e.g., an anchor pixel), is a broadcast (e.g., a broadcast pixel), or has been orphaned (e.g., an orphan pixel), and may optionally efficiently enable the GPU to reduce the set of pixels processed by subsequent deferred shading or post processing passes, and/or reconstruct coverage for pixels that were not rendered, and/or may optionally assign weights to each pixel in post-processing operations.

Figure 1:
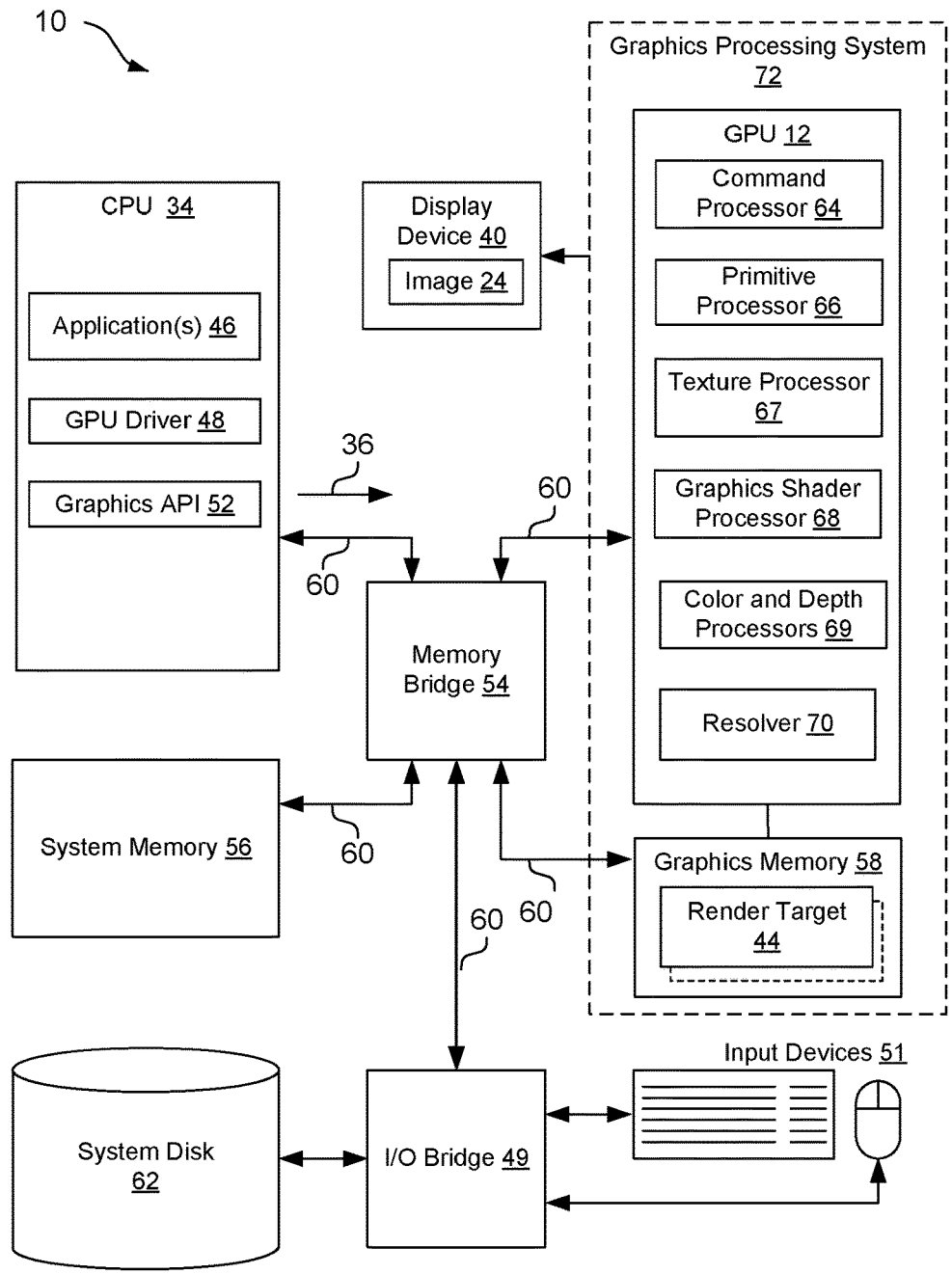
FIG. 1 is a schematic block diagram of an example architecture of a computer device including a graphics processing unit and a graphics pipeline configured according to the described examples.

Referring to FIG. 1, in one example, a computer device 10 includes a graphics processing unit (GPU) 12 configured to implement the described features of performing variable rate shading based on tracking pixel lineage. For example, GPU 12 is configured to determine and use information from variable rate shading, e.g., metadata from the rasterization hardware, to generate and maintain one or more metadata buffers that include information that tracks a shading state (e.g., anchor, broadcast, orphan) of each pixel in an image. This information may be utilized by GPU 12 to perform efficient pixel shading using sparse rendering (e.g., using variable rate shading), and/or to more efficiently reconstruct coverage after performing sparse rendering based on the tracked state of the pixels, and/or to more efficiently blend a temporal sample in a temporal anti-aliasing operation based on the tracked state of the pixels.

For example, in one implementation, computer device 10 includes a CPU 34, which may be one or more processors that are specially-configured or programmed to control operation of computer device 10 according to the described examples. For instance, a user may provide an input to computer device 10 to cause CPU 34 to execute one or more software applications 46. Software applications 46 that execute on CPU 34 may include, for example, but are not limited to one or more of an operating system, a word processor application, an email application, a spread sheet application, a media player application, a video game application, a graphical user interface application or another program. Additionally, CPU 34 may include a GPU driver 48 that can be executed for controlling the operation of GPU 12. The user may provide input to computer device 10 via one or more input devices 51 such as a keyboard, a mouse, a microphone, a touch pad or another input device that is coupled to computer device 10 via an input/output bridge 49, such as but not limited to a Southbridge chipset or integrated circuit.

The software applications 46 that execute on CPU 34 may include one or more instructions that executable to cause CPU 34 to issue one or more graphics commands 36 to cause the rendering of graphics data associated with an image 24 on display device 40. The image 24 may comprise, for example, one or more objects, and each object may comprise one or more primitives, as explained in more detail below. For instance, in some implementations, the software application 46 places graphics commands 36 in a buffer in the system memory 56 and the command processor 64 of the GPU 12 fetches them. In some examples, the software instructions may conform to a graphics application programming interface (API) 52, such as, but not limited to, a DirectX and/or Direct3D API, an Open Graphics Library (OpenGL®) API, an Open Graphics Library Embedded Systems (OpenGL ES) API, an X3D API, a RenderMan API, a WebGL API, a Vulkan API, a Metal API, or any other public or proprietary standard graphics API. In order to process the graphics rendering instructions, CPU 34 may issue one or more graphics commands 36 to GPU 12 (e.g., through GPU driver 48) to cause GPU 12 to perform some or all of the rendering of the graphics data. In some examples, the graphics data to be rendered may include a list of graphics primitives, e.g., points, lines, triangles, quadrilaterals, triangle strips, etc.

Computer device 10 may also include a memory bridge 54 in communication with CPU 34 that facilitates the transfer of data going into and out of system memory 56 and/or graphics memory 58. For example, memory bridge 54 may receive memory read and write commands, and service such commands with respect to system memory 56 and/or graphics memory 58 in order to provide memory services for the components in computer device 10. Memory bridge 54 is communicatively coupled to GPU 12, CPU 34, system memory 56, graphics memory 58, and input/output bridge 49 via one or more buses 60. In an example, for example, memory bridge 54 may be a Northbridge integrated circuit or chipset.

System memory 56 may store program modules and/or instructions that are accessible for execution by CPU 34 and/or data for use by the programs executing on CPU 34. For example, system memory 56 may store the operating system application for booting computer device 10. Further, for example, system memory 56 may store a window manager application that is used by CPU 34 to present a graphical user interface (GUI) on display device 40. In addition, system memory 56 may store user applications 46 and other information for use by and/or generated by other components of computer device 10. For example, system memory 56 may act as a device memory for GPU 12 (although, as illustrated, GPU 12 may generally have a direct connection to its own graphics memory 58) and may store data to be operated on by GPU 12 as well as data resulting from operations performed by GPU 12. For example, system memory 56 may store any combination of texture buffers, depth buffers, stencil buffers, vertex buffers, frame buffers, or the like. System memory 56 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), Flash memory, a magnetic data media or an optical storage media.

Additionally, in an example, computer device 10 may include or may be communicatively connected with a system disk 62, such as a CD-ROM or other removable memory device. System disk 62 may include programs and/or instructions that computer device 10 can use, for example, to boot operating system in the event that booting operating system from system memory 56 fails. System disk 62 may be communicatively coupled to the other components of computer device 10 via input/output bridge 49.

GPU 12 may be configured to perform graphics operations to render one or more render targets 44 (e.g., based on graphics primitives) to display device 40 to form image 24. For instance, when one of the software applications 46 executing on CPU 34 requires graphics processing, CPU 34 may provide graphics commands and graphics data associated with image 24, along with graphics command 36, to GPU 12 for rendering image 24 to display device 40. The graphics data may include, e.g., drawing commands, state information, primitive information, texture information, etc. GPU 12 may include one or more processors, including a command processor 64 for receiving graphics command 36 and initiating or controlling the subsequent graphics processing by at least one primitive processor 66 for assembling primitives, a plurality of graphics shader processors 68 for processing vertex, surface, pixel, and other data for GPU 12, one or more texture processors 67 for generating texture data for fragments or pixels, and one or more color and depth processors 69 for generating color data and depth data and merging the shading output. For example, in one use case, primitive processor 66 may implement one or more stages of a logical graphics pipeline, as is discussed below. GPU 12 may, in some instances, be built with a highly parallel structure that provides more efficient processing of complex graphic-related operations than CPU 34. For example, GPU 12 may include a plurality of processing elements that are configured to operate on multiple vertices or pixels in a parallel manner. The highly parallel nature of GPU 12 may, in some instances, allow GPU 12 to draw graphics image 24, e.g., GUIs and two-dimensional (2D) and/or three-dimensional (3D) graphics scenes, onto display device 40 more quickly than drawing the image 24 directly to display device 40 using CPU 34.

GPU 12 may, in some instances, be integrated into a motherboard of computer device 10. In other instances, GPU 12 may be present on a graphics card that is installed in a port in the motherboard of computer device 10 or may be otherwise incorporated within a peripheral device configured to interoperate with computer device 10. GPU 12 may include one or more processors, such as one or more microprocessors, application specific integrated circuits (ASICs), field programmable gate arrays (FPGAs), digital signal processors (DSPs), or other equivalent integrated or discrete logic circuitry.

In an example, GPU 12 may be directly coupled to graphics memory 58 to enable relatively fast access to data (e.g., as compared to having to access system memory 56 via bus 60 and memory bridge 54). For example, graphics memory 58 may store any combination of index buffers, vertex buffers, texture buffers, depth buffers, stencil buffers, render target buffers, frame buffers, variable rate shading buffers, invocation buffers, lineage buffers, state information, shader resources, constants buffers, coarse shading rate parameter (SRP) maps (e.g., a 2D map of a viewable area at coarse resolution that can be used to look-up an SRP value based on a closest point in the map to the transformed vertex), unordered access view resources, graphics pipeline stream outputs, or the like. As such, GPU 12 may read data from and write data to graphics memory 58 without using bus 60. In other words, GPU 12 may process data locally using storage local to the graphics card, instead of system memory 56. This allows GPU 12 to operate in a more efficient manner by eliminating the need of GPU 12 to read and write data via bus 60, which may experience heavy bus traffic. In some instances, however, GPU 12 may not include a separate memory, but instead may utilize system memory 56 via bus 60. Graphics memory 58 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), Flash memory, a magnetic data media or an optical storage media.

CPU 34 and/or GPU 12 may store rendered image data, e.g., render targets 44, in a render target buffer of graphic memory 58. It should be noted that the render target buffer also may be an independent memory or may be allocated within system memory 56. GPU 12 may further include a resolver component 70 configured to retrieve the data from a render target buffer of graphic memory 58 and convert multi-sample data into per-pixel color values to be sent to display device 40 to display image 24 represented by the rendered image data. In some examples, GPU 12 may include a digital-to-analog converter (DAC) that is configured to convert the digital values retrieved from the resolved render target buffer into an analog signal consumable by display device 40. In other examples, GPU 12 may pass the digital values to display device 40 over a digital interface, such as a High-Definition Multi-media Interface (HDMI interface) or a DISPLAYPORT interface, for additional processing and conversion to analog. As such, in some examples, the combination of GPU 12, graphics memory 58, and resolver component 70 may be referred to as a graphics processing system 72.

Display device 40 may include a monitor, a television, a projection device, a liquid crystal display (LCD), a plasma display panel, a light emitting diode (LED) array, such as an organic LED (OLED) display, a cathode ray tube (CRT) display, electronic paper, a surface-conduction electron-emitted display (SED), a laser television display, a nanocrystal display or another type of display unit. Display device 40 may be integrated within computer device 10. For instance, display device 40 may be a screen of a mobile telephone. Alternatively, display device 40 may be a stand-alone device coupled to computer device 10 via a wired or wireless communications link. For instance, display device 40 may be a computer monitor or flat panel display connected to a personal computer via a cable or wireless link.

According to one example of the described features, graphics API 52 and GPU driver 48 may configure GPU 12 to execute logical graphics pipeline 14 to perform variable rate shading, and to determine and use information from variable rate shading to generate and maintain one or more variable rate buffers that include information that tracks a shading state of each pixel in an image, which allows more efficient shading and post-processing operations, as described herein.

Figure 2:
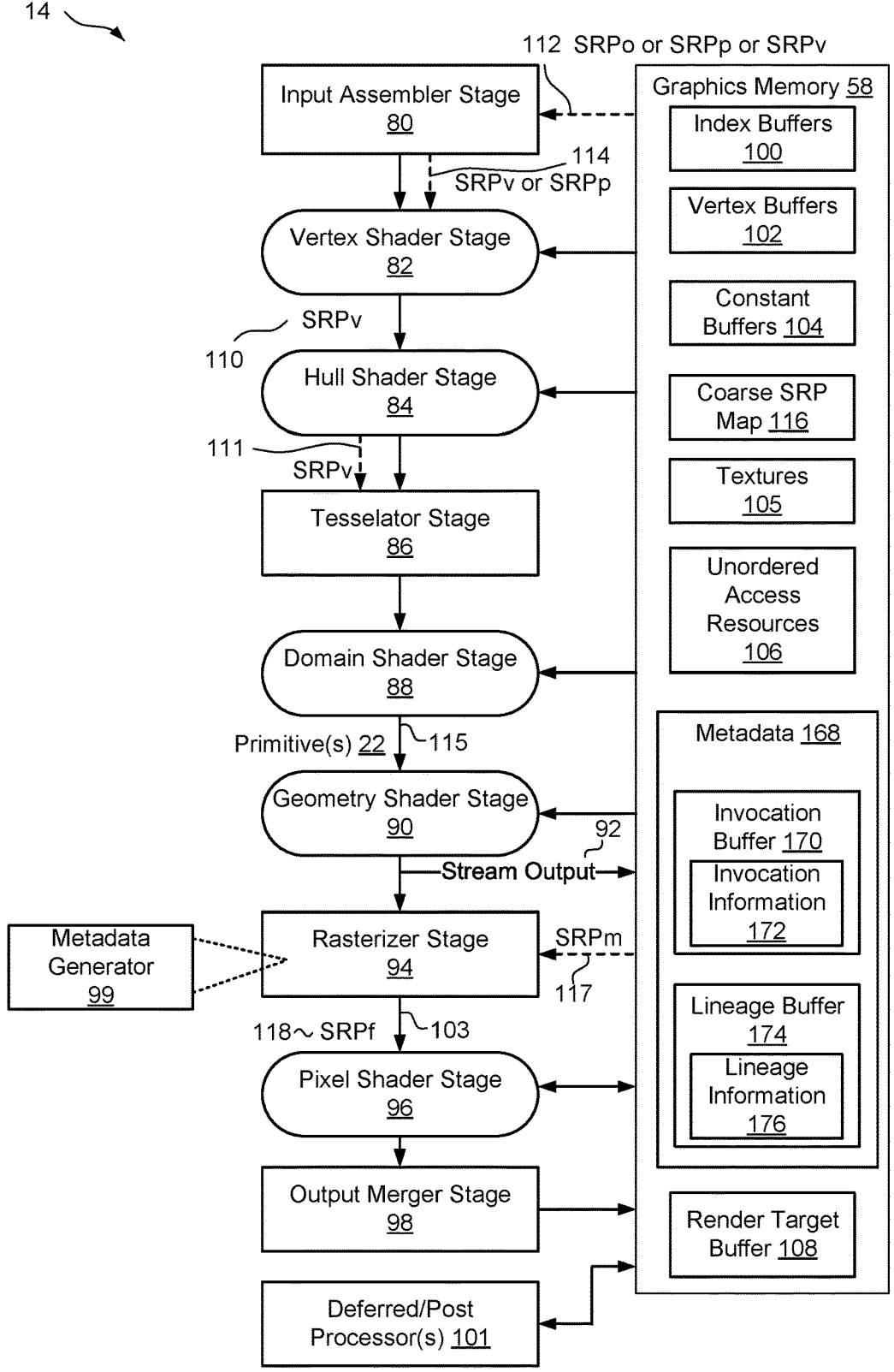
FIG. 2 is a schematic diagram of an example of the graphics pipeline and graphics memory of the computer device of FIG. 1.

Referring to FIG. 2, for instance, in one example, GPU 12 can be configured to implement the stages of an example logical graphics pipeline 14 that may perform variable rate shading and tracking a state of each pixel as described herein. In an example, one or more of the various stages may be programmable, for instance, to provide variable rate shading based on tracking pixel lineage described herein. Moreover, in an example, common shader cores may be represented by the rounded rectangular blocks. The purpose of each of the example stages in the example logical graphics pipeline 14 is now described in brief below, and additional functionality is further described with respect to subsequent figures. The logical graphics pipeline 14 may include all or a portion of these stages (and/or additional stages) for generating an image.

The input assembler stage 80 supplies data (e.g., quads, triangles, lines, points, indexes, etc.) to the pipeline. It also optionally processes shading rate parameters per object (SRPo), per primitive (SRPp), or per vertex (SRPv), generally referenced at 112, as determined by the application 46 (FIG. 1). As generally indicated at 114, input assembler stage 80 may output the SRPp, or an SRPv if the SRPv is not generated by a vertex shader stage 82.

The vertex shader stage 82 processes vertices, typically performing operations such as transformations, skinning, and lighting. Vertex shader stage 82 takes a single input vertex and produces a single output vertex. Also, as indicated at 110, vertex shader stage 82 optionally inputs the per-vertex shading rate parameter (SRPv) or the per-primitive shading rate parameter (SRPp) and typically outputs an SRPv, that is either input or calculated or looked up. It should be noted that, in some implementations, such as when using higher-order surfaces, the SRPv comes from a hull shader stage 84.

The hull shader stage 84, a tessellator stage 86, and a domain-shader 88 stage comprise the tessellation stages. The tessellation stages convert higher-order surfaces to primitives, e.g., triangles, as indicated at 115, for rendering within logical graphics pipeline 14. Optionally, as indicated at 111, hull shader stage 84 can generate the SRPv value for each vertex of each generated primitive (e.g., triangle).

The geometry shader stage 90 optionally (e.g., this stage can be bypassed) processes entire primitives 22. Its input may be a full primitive 22 (FIG. 5), which is three vertices for a triangle, two vertices for a line, or a single vertex for a point, a quad, or a rectangle. In addition, each primitive 22 can also include the vertex data for any edge-adjacent primitives. This could include at most an additional three vertices for a triangle or an additional two vertices for a line. The geometry shader stage 90 also supports limited geometry amplification and de-amplification. Given an input primitive 22, the geometry shader stage 90 can discard the primitive 22, or emit one or more new primitives 22. Each primitive 22 emitted can output an SRPv for each vertex.

The stream-output stage 92 streams primitive data from graphics pipeline 14 to graphics memory 58 on its way to the rasterizer. Data can be streamed out and/or passed into a rasterizer stage 94. Data streamed out to graphics memory 58 can be recirculated back into graphics pipeline 14 as input data or read-back from the CPU 34 (FIG. 1). This stage may optionally stream out SRPv values to be used on a subsequent rendering pass.

The rasterizer stage 94 clips primitives, prepares primitives for a pixel shader stage 96, and determines how to invoke pixel shaders. Further, as generally indicated at 118, the rasterizer stage 94 can perform coarse scan conversions and determine a per-fragment variable shading rate parameter value (SRPf) (e.g., where the fragment may be a tile, a sub-tile, a quad, a pixel, or a sub-pixel region). Additionally, the rasterizer stage 94 performs fine scan conversions and determines pixel sample positions covered by the fragments.

Further, as indicated at 117, the rasterizer stage 94 can also obtain lookup values (SRPm) from coarse SRP map 116. The lookup values correspond to shading rates specified for a larger area, such as a screen space of the image 24 or the entire image 24. Additionally, the rasterizer stage 94 computes SRPf as a function of SRPv and the lookup values (SRPm), as described in further detail below.

The pixel shader stage 96 receives interpolated data for primitives 22 and/or fragments 18 (FIG. 5) and generates per-pixel data, such as color and sample coverage masks.

The output merger stage 98 combines various types of pipeline output data (pixel shader values, depth and stencil information, and coverage masks) with the contents of the render target 44 (FIG. 1) and depth/stencil buffers to generate the final result of graphics pipeline 14.

Also, as discussed above and as illustrated in FIG. 2, graphics pipeline 14 may operate in conjunction with graphics memory 58 for exchanging and storing data. For example, in one use case, graphics memory 58 includes one or more vertex buffers 102 that each contains the vertex data used to define geometry of image 24 (or other images). Vertex data includes position coordinates, color data, texture coordinate data, normal data, and so on. The simplest example of vertex buffer 102 is one that only contains position data. More often, vertex buffer 102 contains all the data needed to fully specify 3D vertices. An example of this could be vertex buffer 102 that contains per-vertex position, normal and texture coordinates. This data is usually organized as sets of per-vertex elements.

Further, in an example, graphics memory 58 may include one or more index buffers 100, which contain integer offsets into vertex buffers 102 and are used to render primitives 22 more efficiently. Each index buffer 100 contains a sequential set of indices; each index is used to identify a vertex in a vertex buffer 102.

Also, in an example, graphics memory 58 may include one or more constant buffers 104 that allows an efficient supply of shader constants, shader data, and/or any other shader resources to graphics pipeline 14. Further, constant buffer 104 can be used to store the results of the stream-output stage 92. Moreover, graphics memory 58 may include one or more texture buffers or textures data (e.g., textures) 105, such as bitmaps of pixel colors that give an object the appearance of texture.

Additionally, in an example, graphics memory 58 may include one or more unordered access resources 106 (which includes buffers, textures, and texture arrays —without multisampling). Unordered access resources 106 allow temporally unordered read/write access from multiple threads. This means that this resource type can be read and/or written simultaneously by multiple threads without generating memory conflicts through the use of certain defined functions.

Moreover, in an example, graphics memory 58 may include one or more render target buffers 108, which contain the rendered target or drawing of each pixel 32 (FIG. 5) of image 24 produced by graphics pipeline 14.

As described in more detail below with respect to the method of operation of graphics pipeline 14 according to the described apparatus and methods, input assembler stage 80 and/or vertex shader stage 82 are configured to determine an SRP value per vertex (SRPv) 110 for each vertex of each primitive 22 of image 24. For example, SRPv value 110 may be determined for each vertex based on one or more SRP values per object (SRPo), SRP values per primitive (SRPp), or SRPp values supplied by application 46 (FIG. 1), e.g., at 112, and/or determined by input assembler stage 80, e.g., at 114, or based on a coarse SRP map 116. Further, rasterizer stage 94 may interpolate and quantize respective SRPv values 110 for different sub-tiles or fragments 18 of each primitive 22 to define SRP values per fragment (SRPf) 118.

Pixel shader stage 96 then launches respective threads and performs variable rate shading per fragment of one or more primitives 22 based on each respective SRPf 118, thereby shading variable-area color fragments for use in rendering image 24.

As described further herein, the present apparatus and methods include a metadata generator 99 that generates metadata 103 and maintains one or more metadata buffers 168, such as but not limited to an invocation buffer 170 and a lineage buffer 174, for tracking the state of each pixel. Further, metadata 103 in the one or more metadata buffers 168 may be used by GPU 12 in additional shading (known as deferred shading) and/or post-processing of image 24. For example, metadata 103 may be the same information as, or a subset or derivation of, the information provided as an input to pixel shader stage 96, including information that identified each pixel of a primitive as being an anchor pixel, a broadcast pixel (and which pixel it points to or references, e.g., to copy shading information), or an orphan pixel (if the pixel was a broadcast pixel but the anchor pixel was overwritten by a subsequent primitive). For example, pixel tracking buffer generator 99 may be logic implemented by the hardware of rasterization stage 94.

Figure 7A:
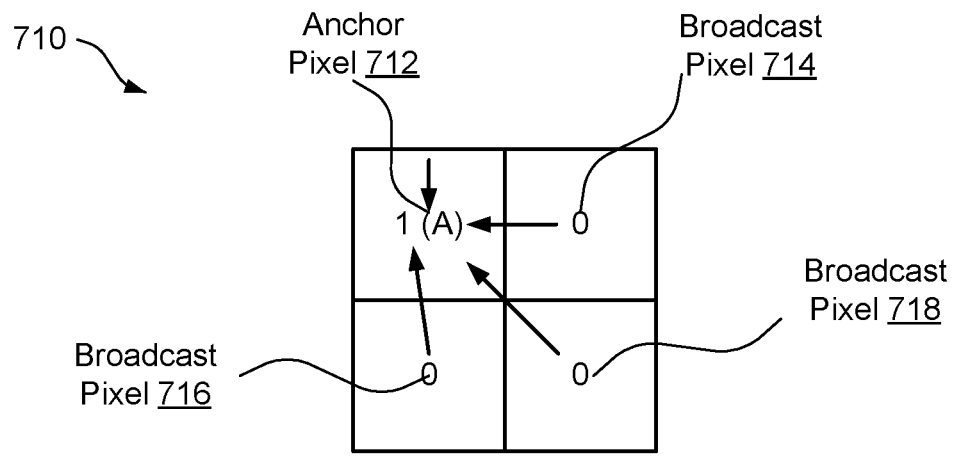
FIGS. 7A and 7B are additional examples of invocation and lineage information associated with a 2×2 quad of pixels according to the described examples.

As mentioned above, the state of a pixel may be one of: an anchor pixel (or anchor), which is a pixel written by a pixel shader; a broadcast pixel (or broadcast), which is a copy of another pixel written by the pixel shader; or, an orphan pixel (or orphan), which was previously a broadcast pixel until its anchor was overwritten. Accordingly, the one or more metadata buffers 168 can store information related to pixels that are modified as a result of performing the variable rate shading. For example, based on the shading rate for a given fragment, only a subset of pixels (e.g., anchor pixels) corresponding to a subset of samples of the fragment will be written by pixel shader stage 96. In one example, remaining pixels may be determined as a result of broadcasting the shaded sample/pixel to a nearby pixel (e.g., nearby in a coordinate space). For instance, given a 2 pixel by 2 pixel fragment (e.g., a tile) having a variable shading rate of ¼, a top left pixel may be shaded and thus is considered the sample or anchor pixel, while the remaining 3 pixels may copy the value of the sample or anchor pixel and thus be considered broadcast pixels, e.g., as illustrated in FIG. 7A.

More specifically, invocation buffer 170 includes invocation information 172 that identifies for each pixel whether pixel shader stage 96 was invoked at that location the last time the pixel was covered by a primitive. Lineage buffer 174 includes lineage information 176 that defines a lineage for each pixel, or, in other words, from where does the shading information for the pixel originate. In one example, lineage information 176 may include, but is not limited to, a pointer or other reference associated with the respective pixel. For example, the pointer or reference may point to another pixel from which the pixel is copied (e.g., in the case where the pixel is a broadcast pixel, it points to an anchor pixel), or where the pointer or reference points to the pixel itself (referred to as "point self")(e.g., where the pixel is an anchor pixel or orphan pixel).

Figure 3A:
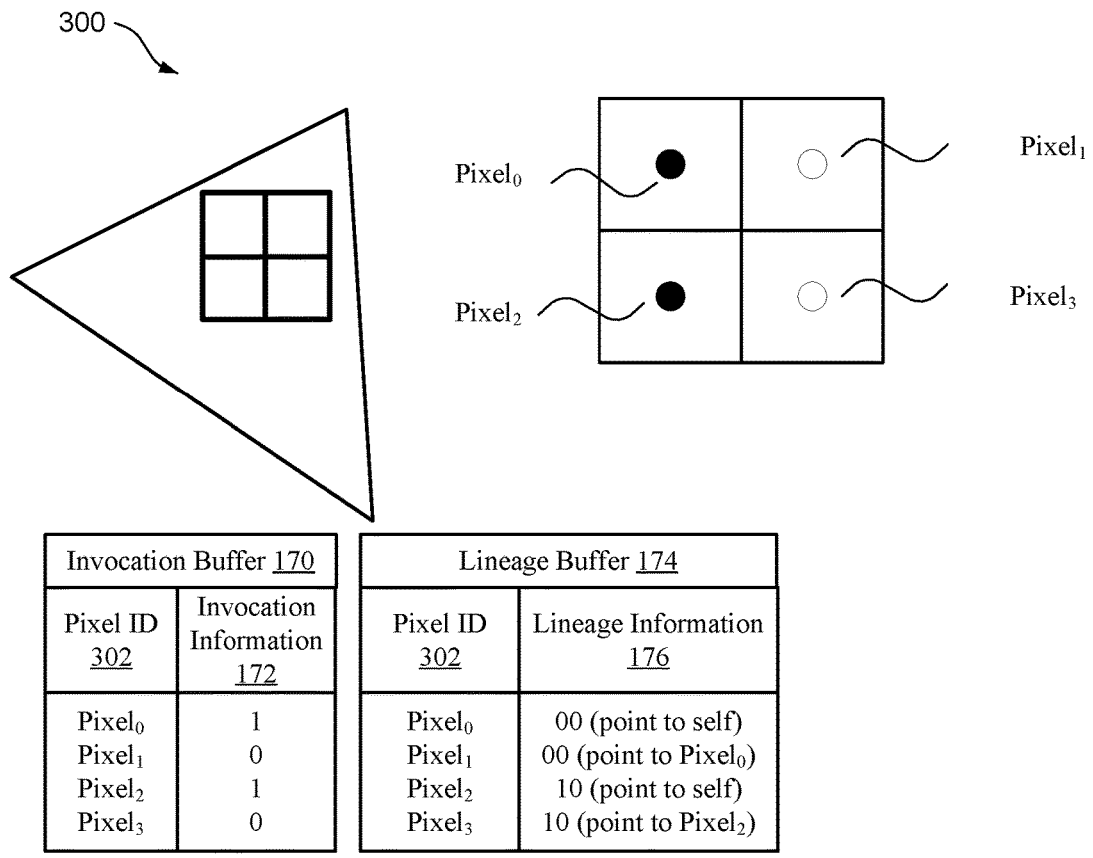
FIG. 3A is a diagram of example 2 pixel×2 pixel quad of a primitive, and example invocation and lineage buffers.

Referring to FIG. 3A, for example, one implementation of invocation buffer 170 and lineage buffer 174 may be explained with reference to a 2 pixel×2 pixel quad 300 of a primitive, where $pixel_0$ is pixel is that is written (as represented by the shaded circle) and is an anchor pixel, $pixel_1$ is a broadcast pixel (as indicated by the non-shaded circle) copied from $pixel_0$, $pixel_2$ is currently written (as represented by the shaded circle) and is an anchor $pixel_0$, and $pixel_2$ is a broadcast pixel (as indicated by the non-shaded circle) copied from $pixel_2$. An anchor pixel remains as an anchor pixel unless overwritten by a subsequent primitive.

Invocation buffer 170 may include a set of pixel identifiers (IDs) 302 corresponding to each pixel in quad 300, and corresponding invocation information 172 for each pixel. As mentioned, invocation information 172 can be any data that identifies whether or not pixel shader stage 96 was invoked the last time the pixel was covered. In this implementation, invocation information 172 may be efficiently represented by a single bit, where a value of "0" indicates that pixel shader stage 96 was not invoked the last time the pixel was covered, and a value of "1" indicates that pixel shader stage 96 was invoked the last time the pixel was covered. It should be understood that other conventions and/or other types or combination of data may be used to represent invocation information 172. Thus, in this example where pixels 0-3 having invocation information 172 with values of {1, 0, 1, 0}, GPU 12 or one or more post processors 101 can quickly and easily identify from invocation buffer 170 that $pixel_0$ and $pixel_2$ are anchor pixels while $pixel_1$ p and $pixel_3$ are non-anchor pixels.

Further, lineage buffer 174 may include the set of pixel identifiers (IDs) 302 corresponding to each pixel in quad 300, and corresponding lineage information 176 for each pixel. As mentioned, lineage information 176 can be any data that defines a lineage or origin of the shading information for the pixel. In this implementation, lineage information 176 may be efficiently represented by two bits, where the combination of values of each bit identify a respective pointer to a respective pixel in quad 300. For example, lineage information 176 having a value of "00" points to $pixel_0$, "01" points to $pixel_1$, "10" points to $pixel_2$, and "11" points to $pixel_3$. It should be understood that other conventions and/or other types or combination of data may be used to represent lineage information 176. Thus, in this example where pixels 0-3 having lineage information 176 with values of {00, 00, 10, 10}, GPU 12 or one or more deferred/post processors 101 can quickly and easily tell from lineage buffer 174 that $pixel_1$ and $pixel_3$ are broadcast pixels.

Figure 3B:
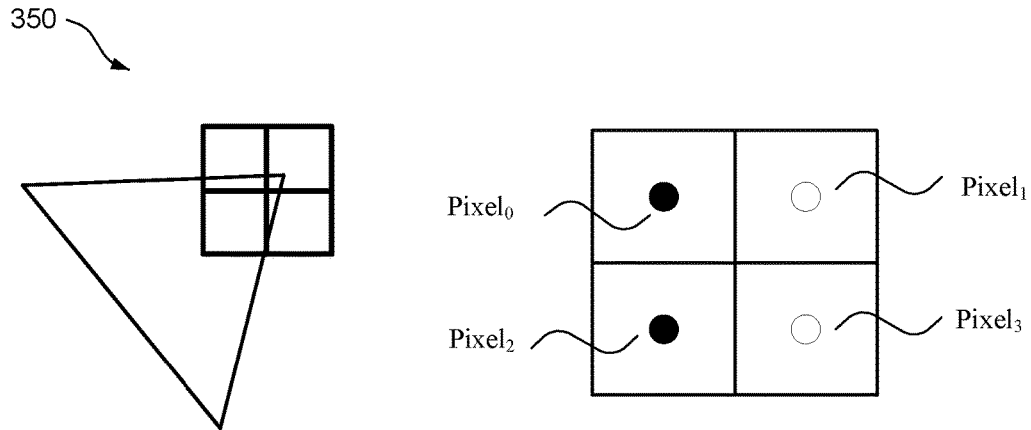
FIG. 3B is a diagram of an additional example 2 pixel×2 pixel quad of a primitive, and example invocation and lineage buffers.

FIG. 3B refers to a quad 350 of a primitive where a pixel is overwritten. For example, FIG. 3B illustrates shading of a second primitive which covers only $pixel_2$ (other pixels not illustrated for simplicity) when $pixel_2$ is overwritten. In such a scenario, the buffers may be updated to indicate that $pixel_3$ is an orphan pixel, having previously been a broadcast pixel. For example, by analyzing both invocation buffer 170 and lineage buffer 174, GPU 12 or one or more post processors 101 can quickly and easily tell that $pixel_3$ is an orphan pixel based on the value "11" of lineage information 176 being a self point value and based on value "0" of invocation information 172 indicating that $pixel_3$ was not previously written, where this combination of values indicates that $pixel_3$ was a broadcast pixel who anchor pixel, $pixel_2$, is now overwritten.

Thus, GPU 12 and/or one or more post-processors 101 (e.g., a fixup pass, temporal anti-aliasing, deferred rendering operations, such as deferred lighting, etc.) may use invocation buffer 170 to determine if a pixel is an anchor or non-anchor, and/or may use the combination of invocation buffer 170 and lineage buffer 174 to differentiate between an orphan and a broadcast, thereby improving the efficiency of their operations.

Figure 4:
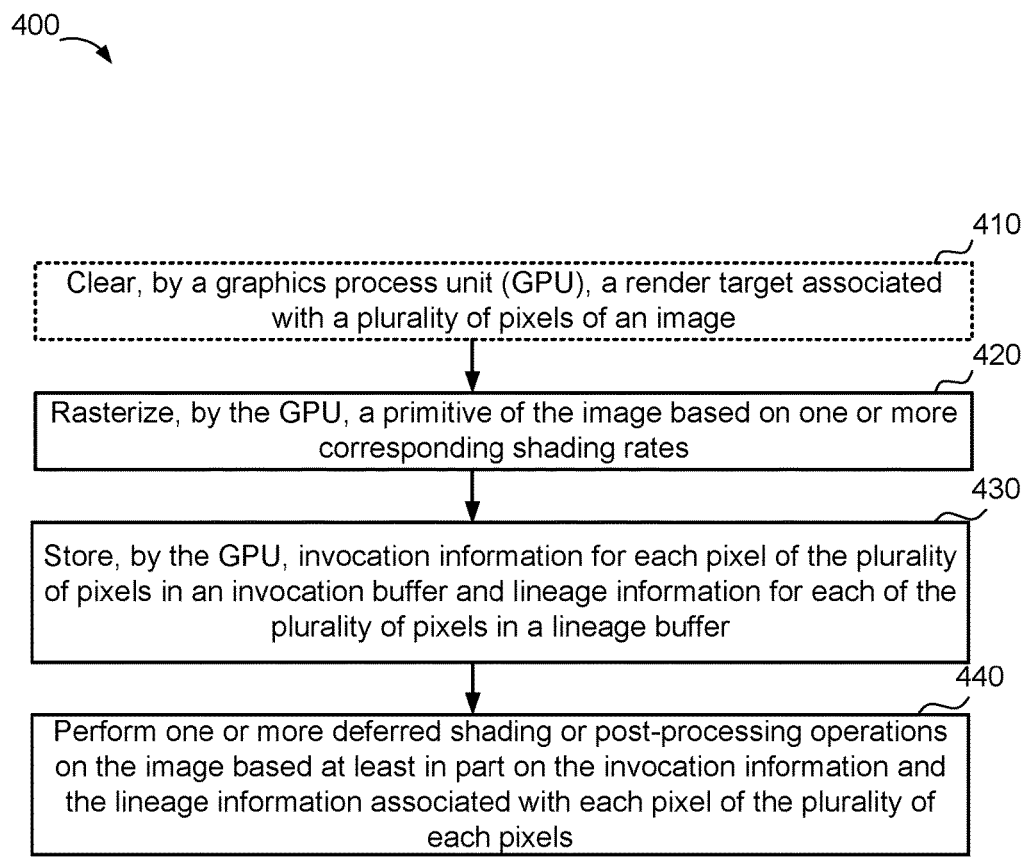
FIG. 4 is a flowchart of an example of a method of performing variable rate shading based on tracking pixel lineage according to the described examples.
Figure 5:
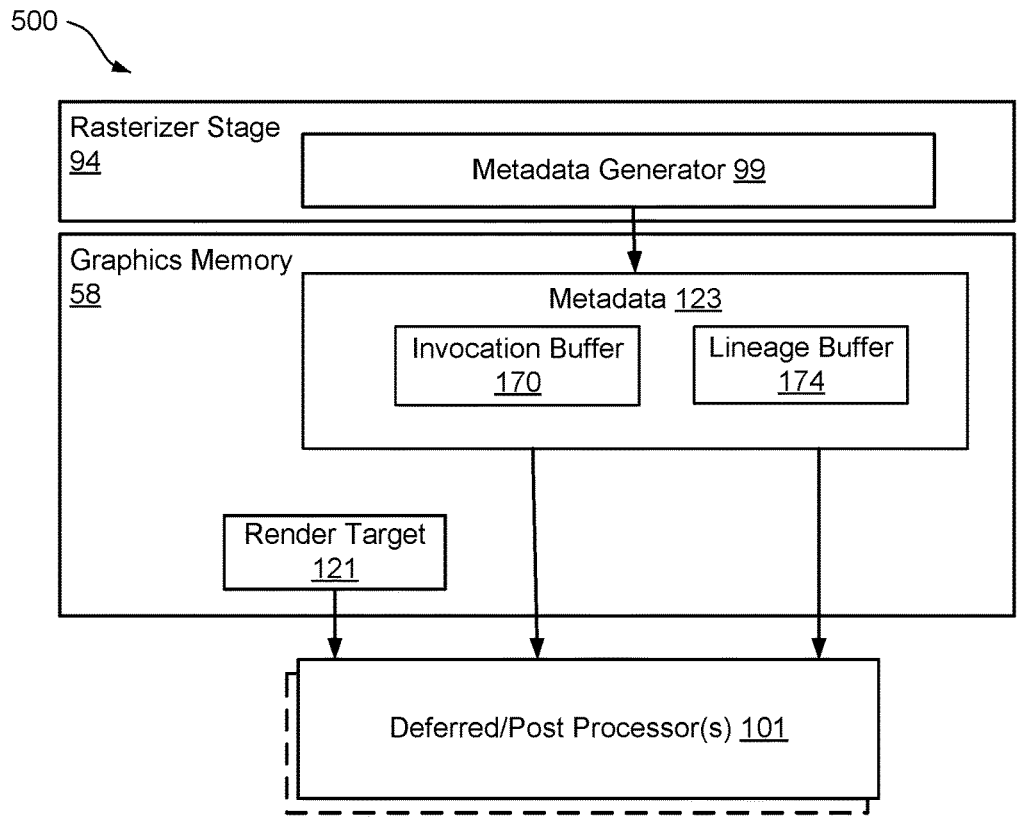
FIG. 5 is a schematic diagram of an example of a pixel tracking buffer generator and subcomponents associated with the operations of tracking pixel lineage in the method of FIG. 4.
Figure 6:
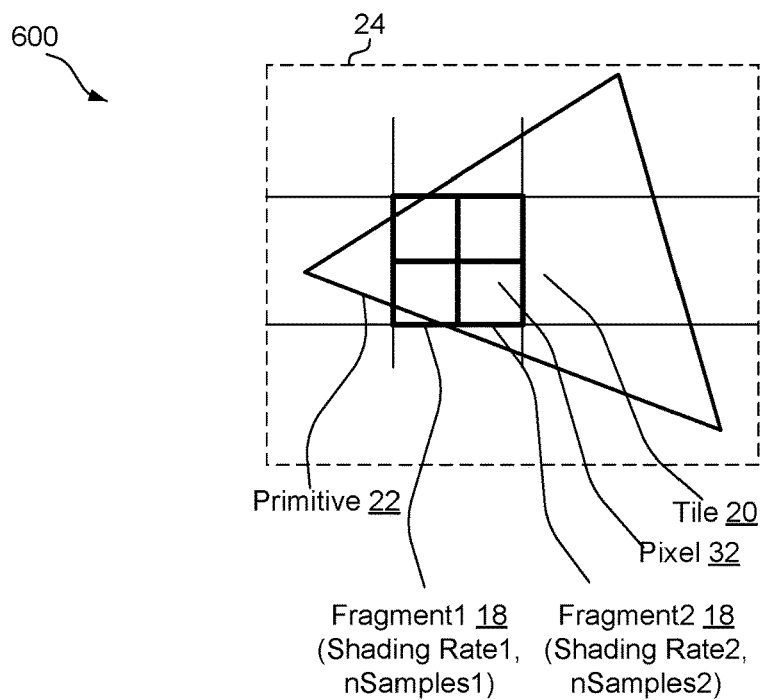
FIG. 6 is a schematic diagram of an example of a primitive of an image, and fragments covered by the primitive according to the described examples.

Referring to FIGS. 4, 5, 6, 7A, and 7B, one example of operating graphics pipeline 14 to perform variable rate shading and/or one or more deferred/post-processing operations based on tracking pixel lineage as described herein may be explained with reference to a method 400 of rendering graphics in FIG. 4, and with reference to components of metadata generator 99 of FIGS. 2 and 5, and the elements of image 24 of FIG. 6. In particular, as illustrated in FIG. 6, method 400 relates to drawing image 24 that includes one or more primitives 22 covering one or more tiles 20, which may include one or more fragments 18 (e.g., sub-tile1 and sub-tile2) per tile 20 and/or one or more pixels 32 that are operated on by graphics pipeline 14 using variable rate shading.

At 410, method 400 may optionally include clearing, by a graphics processing unit (GPU), a render target associated with a plurality of pixels of an image. In an example, for instance, when initially starting the pixel tracking operations of this disclosure, GPU 12 may instantiate graphics pipeline 14 and clear (e.g., shade pixels to a single color and set all bits of invocation buffer 172 and lineage buffer 176 to represent minimum or maximum shading rate for each fragment) a render target, e.g., render target 44, associated with the plurality of pixels of the image, e.g., image 24.

At 420, method 400 may include rasterizing, by the GPU, a primitive of the image based on one or more corresponding rates, wherein the primitive includes a plurality of pixels, wherein the rasterizing generates or updates metadata that indicates whether each pixel is an anchor pixel, a broadcast pixel, or an orphan pixel, wherein each anchor pixel is a pixel for which a pixel shader was previously invoked, wherein each broadcast pixel has shading copied from a referenced anchor pixel, and wherein each orphan pixel has a previously referenced anchor pixel overwritten. In an example, GPU 12 may instantiate graphics pipeline 14 and/or rasterizer stage 94 to rasterize a primitive 22 of image 24 based on one or more shading rates. Primitive 22 may include a plurality of pixels, e.g., $pixel_0$, $pixel_1$, $pixel_2$, and $pixel_3$, as shown in FIG. 3A, where $pixel_0$ is an anchor pixel and $pixel_1$, $pixel_2$, and $pixel_3$ are broadcast pixels pointing to $pixel_0$.

For instance, in one example implementation, referring to FIG. 6 and also FIG. 2, an example primitive 22 on which variable rate shading and pixel tracking may be performed are described herein. In one example, performing variable rate shading, as described herein, may include looking up a coarse SRP map 116 to obtain SRPm 117 for a given pixel. For example, graphics pipeline 14 executes rasterizer stage 94 to look up the SRP map to obtain SRPm, such that, one or more look up values in a SRP map 116 (SRPm 117) may be identified for one or more pixels 32 within one or more primitives 22 of one or more objects based at least on coarse texture map coordinates. In an example, the looked up SRPm can be added to a base shading rate for the pixel stored in a register to produce the final SRP value for the relevant fragments within the designated screen-space tiles.

In this example, the map coordinates include coarse screen position coordinates (X, Y) of each pixel. In an example, fine scan conversion can be performed to determine sample positions covered within the current fragment (or pixel). Further, in this example, in order to calculate the respective SRPf 118, graphics pipeline 14 can execute rasterizer stage 94 to perform a fine scan conversion to determine the respective SRPf 118 using each of the one or more pixels 32 of the one or more primitives using interpolators and SRPm 117. For example, in an example, rasterizer stage 94 may include a fine rasterizer stage configured to perform this functionality. In particular, in an example, for each pixel 32, graphics pipeline 14 can execute rasterizer stage 94 to calculate respective pixel variable SRP values (SRPf 118) based on a base shading rate and a lookup value (e.g., SRPm 117) corresponding to the pixel 32. In an example, fragment variable SRP values for fragments of a coarse SRP map may be calculated based on the function:

$$SRPf = BSR \times 2^{SRPm[x,y]}$$

where BSR corresponds to the base shading rate for the specific pixel 32, and SRPm[x,y] corresponds to the lookup value for the specific pixel 32. In some examples, the base shading rate may correspond to a previous SRPf that is multiple by $2^{SRPm[x,y]}$.

For example, the shading rate (e.g., SRPf) can indicate a shading rate for each pixel, or subsets of pixels, in the fragment. In an example, the shading rate can indicate a number of samples per quad (e.g., 2×2 quad of pixels, although other sized quads may be used) over which to perform shading (where a sample corresponds to an anchor pixel), and one or more of the shaded samples can be broadcast into other pixels (referred to as broadcast pixels) in the quad. In one example, pixel shader stage 96 can shade a given primitive 22 by shading a subset of pixels (e.g., anchor pixels) in a fragment 18 corresponding to the primitive 22, where the subset of pixels are determined based on the shading rate, and broadcasting the shaded value of a given pixel to one or more other pixels. Moreover, for example, shading the subset of pixels can include pixel shader stage 96 storing the set of pixels of a fragment, and/or related parameter values, in one or more render targets 121. In an example, in rasterizing the set of pixels at 420, rasterizer stage 94 can also generate, at 430, metadata 123 related to the shading process. Metadata 123 may include invocation information 172 and/or lineage information 176. In another example, GPU pipeline 14 or a compute shader may derive invocation information 172 and/or lineage information 176 from render target 44 in render target buffer 108 after primitive rendering is complete.

Referring back to FIGS. 4 and 5, at 430, method 400 may include storing, by the GPU, invocation information for each pixel of the plurality of pixels in an invocation buffer and lineage information for each pixel of the plurality of pixels in a lineage buffer, wherein the invocation information indicates whether the respective pixel is the anchor pixel, wherein the lineage information indicates whether the respective pixel is the broadcast pixel, and wherein a combination of the invocation information and the lineage information indicates whether the respective pixel is the orphan pixel. In an example, GPU 12 may instantiate rasterizer stage 94 and/or metadata generator 99 to store invocation information 172 of each pixel of the plurality of pixels in invocation buffer 170 and lineage information 176 of each pixel of the plurality of pixels in lineage buffer 174. Thus, after the operations at 430, invocation buffer 170 and lineage buffer 174 may be stored in graphics memory 58 and contain pixel tracking information for the pixels covered by at least one primitive, which can be used for performing deferred shading or post-processing operations on the image.

Optionally, for a new primitive, method 400 may further include performing rasterizing, storing, and shading related to the new primitive. For example, GPU 12 may instantiate graphics pipeline 14, rasterizer stage 94, and/or pixel shader stage 96 to rasterize the new primitive of image 24, store (e.g., update, revise, etc.) invocation information 172 and lineage information 176, and perform shading of the pixels of the new primitive.

At 440, method 400 includes performing one or more deferred shading or post-processing operations on the image based at least in part on the invocation information and the lineage information associated with each pixel of the plurality of pixels. In an example, GPU 12 and/or one or more deferred/post processors 101 may perform one or more deferred shading or post-processing operations on the image (e.g., image 24) based at least in part on the invocation information (e.g., invocation information 172) and the lineage information (e.g., lineage information 176). For instance, when post processor 101 includes temporal anti-aliasing, the temporal anti-aliasing process may identify whether any of the orphan pixels have a respective valid temporal sample available. A temporal sample may be generally defined as a corresponding sample from a previous frame. In one scenario, when the temporal anti-aliasing process identifies that one or more orphan pixels have valid temporal samples, the respective temporal samples may be copied instead of performing deferred shading on the orphan pixels.

For instance, to perform temporal anti-aliasing, GPU 12 or deferred/post processor 101 may assign different weights to a respective pixel based on the type of the pixel. For example, a first weight (e.g., W1) may be assigned to each anchor pixel, a second weight (e.g., W2) to each broadcast pixel, and a third weight (e.g., W3) to each orphan pixel. The first weight is greater than the second weight and the first weight is greater than the third weight. That is, W1>W2 and W1>W3. Graphics pipeline 14 and/or deferred/post processor 101 may perform the deferred shading/post processing based on the assigned weights, wherein the weights are assigned such that the subset of the set of the pixels are blended with respective temporal samples during temporal anti-aliasing.

In a further implementation, one or more post processors 101 may perform one or more other post-processing operations on the image based at least in part on invocation information 172 and lineage information 176 associated with pixels of the primitives of image 24. In one implementation, the other post processing operations on the image may include performing a reprojection, or one or more deferred rendering operations, such as but not limited to deferred lighting operations, or any combination thereof.

For example, invocation information 172 indicates whether a pixel shader stage was previously invoked for the pixel. In other words, invocation information 172 for a pixel indicates whether the pixel shader stage 96 was invoked the last time the pixel was covered. In one implementation, invocation information 172 for a pixel is one bit in size (e.g., 1 bit/pixel) and stored in an invocation buffer 170 at GPU 12. For example, as illustrated in FIG. 3, invocation information 172 having a value of "0" may indicate that pixel shader stage 96 was not invoked the last time the pixel was covered and invocation information 172 having a value of "1" may indicate that pixel shader stage 96 was invoked the last time the pixel was covered.

Figure 7B:
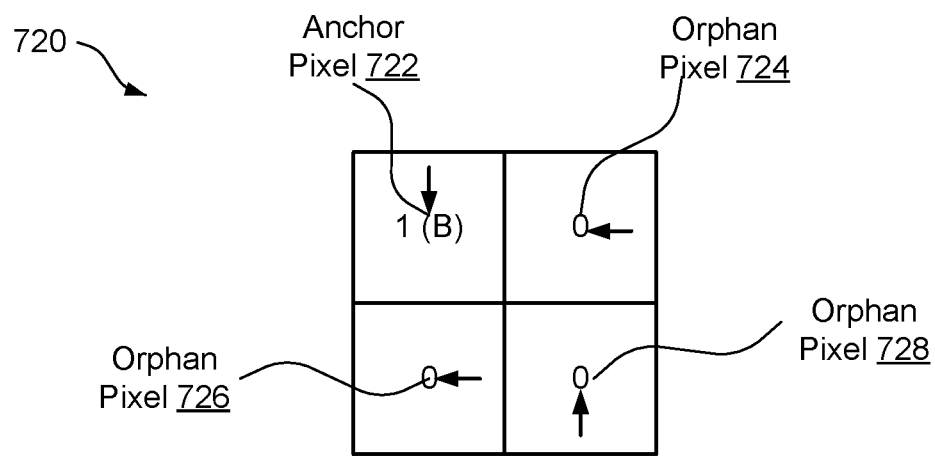

In one implementation, referring to FIGS. 7A and 7B, GPU 12, graphics pipeline 14 and/or pixel shader stage 96 may perform the pixel shading on each of the anchor pixels and orphan pixels. For example, anchor pixel 722 of FIG. 7B and orphan pixels 724, 726, and 728 of FIG. 7B may be shaded together based on invocation information 172 and lineage information 176 corresponding to the pixels. For instance, FIG. 7A illustrates an initial configuration of 2×2 pixel fragment 710 (e.g., a tile, 2×2 quad, etc.) of a first primitive having a variable shading rate of ¼. A top left pixel 712 may be shaded (e.g., shading status represented by "1" and to a shading value "A"), and thus is considered an anchor pixel. The remaining three pixels (714, 716, and/or 718) have shading status of "0" indicating they are broadcast pixels (e.g., a copy of the shading of anchor pixel 712). The arrows in FIG. 7A represent pointers that point to a source of the shading for the given pixel. FIG. 7B illustrates a 2×2 pixel fragment 720 of a second primitive having a variable shading rate of ¼, wherein fragment 720 overlaps fragment 710 of FIG. 7A. In this case, the top left pixel 722 may be shaded again, e.g., to a shading value "B" with a shading status represented by 1, and thus considered as an anchor pixel. The remaining three pixels, e.g., 714, 716, and/or 718, with a value of 0, are considered as orphan pixels as their anchor pixel (e.g., anchor pixel 712 with a value of A) has been overwritten.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various examples are described herein in connection with a device (e.g., computer device 10), which can be a wired device or a wireless device. Such devices may include, but are not limited to, a gaming device or console, a laptop computer, a tablet computer, a personal digital assistant, a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various examples or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the examples disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some examples, the processor and the storage medium may reside in an ASIC. Additionally, the ASIC may reside in a computer device (such as, but not limited to, a game console). In the alternative, the processor and the storage medium may reside as discrete components in a user terminal. Additionally, in some examples, the steps and/or actions of a method or algorithm may reside as one or any combination or set of codes and/or instructions on a machine readable medium and/or computer readable medium, which may be incorporated into a computer program product.

In one or more examples, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While examples of the present disclosure have been described in connection with examples thereof, it will be understood by those skilled in the art that variations and modifications of the examples described above may be made without departing from the scope hereof. Other examples will be apparent to those skilled in the art from a consideration of the specification or from a practice in accordance with examples disclosed herein.

What is claimed is:

1. A method of variable rate shading, comprising:
rasterizing, by a graphics processing unit (GPU), a primitive of an image based on one or more corresponding shading rates, wherein the primitive includes a plurality of pixels;
generating, based on the rasterizing, metadata that identifies whether each pixel of the plurality of pixels is one of an anchor pixel, a broadcast pixel, or an orphan pixel, wherein each anchor pixel is a pixel for which a pixel shader was previously invoked, wherein each broadcast pixel includes shading information copied from a referenced anchor pixel, and wherein each orphan pixel includes shading information copied from a previously referenced anchor pixel that was overwritten;
tracking, by the GPU, a shading state for each pixel of the plurality of pixels based on the metadata by generating invocation information stored in an invocation buffer and lineage information stored in a lineage buffer, wherein the invocation information includes information about the pixel shader to indicate whether a respective pixel is the anchor pixel, wherein the lineage information includes pointer information identifying one of the plurality of pixels from which shading information originated to indicate whether the respective pixel is the broadcast pixel, and wherein a combination of the invocation information and the lineage information indicates whether the respective pixel is the orphan pixel; and
performing one or more deferred shading or post-processing operations on at least one pixel of the plurality of pixels of the image based at least in part on the shading state of the at least one pixel as tracked by the invocation information and the lineage information.

2. The method of claim 1, wherein performing the one or more deferred shading or post-processing operations on the image includes performing a reprojection, a temporal anti-aliasing, a deferred lighting operation, or a combination thereof.

3. The method of claim 1, further comprising:
performing pixel shading on each anchor pixel and each orphan pixel identified based on the invocation information and the lineage information; and
copying a result of the pixel shading for each broadcast pixel from a corresponding referenced anchor pixel identified in the lineage information.

4. The method of claim 3, further comprising:
determining that at least one anchor pixel of the primitive is overwritten; and
updating the lineage information to identify a respective broadcast pixel as a respective orphan pixel for any broadcast pixel of the primitive pointing to the at least one anchor pixel that is overwritten by performing the pixel shading.

5. The method of claim 1, wherein performing the one or more deferred shading or post-processing operations on the image includes performing a temporal anti-aliasing, wherein the temporal anti-aliasing further comprises:
identifying one or more orphan pixels based on the invocation information and the lineage information;
identifying whether any of the one or more orphan pixels have a respective valid temporal sample available; and
copying a value of the respective valid temporal sample instead of performing deferred shading on the one or more orphan pixels.

6. The method of claim 1, wherein performing the one or more deferred shading or post-processing operations on the image further comprises:
assigning a first weight to each anchor pixel, a second weight to each broadcast pixel, and a third weight to each orphan pixel, wherein the first weight is greater than the second weight and the first weight is greater than the third weight, and wherein the first weight, the second weight, and the third weight are assigned based on the invocation information and the lineage information; and
performing the one or more deferred shading or post-processing operations on the image based at least on the first weight, the second weight, and the third weight, wherein the first weight, the second weight, and the third weight are assigned such that a subset of the plurality of pixels are blended with respective temporal samples during temporal anti-aliasing.

7. The method of claim 6, further comprising:
determining whether the at least one pixel is a respective anchor pixel based at least on the invocation information of the pixel stored in the invocation buffer; or
determining whether the at least one pixel is a respective orphan pixel based at least on the invocation information stored in the invocation buffer and the lineage information of the pixel stored in the lineage buffer.

8. The method of claim 1, further comprising:
clearing, by the GPU, a render target associated with the plurality of pixels of the image.

9. The method of claim 1, wherein a size of the invocation buffer is one bit per pixel and a size of the lineage buffer is two bits per pixel.

10. The method of claim 1, wherein performing the one or more deferred shading or post-processing operations on the at least one pixel of the plurality of pixels further comprises performing on a minimum number of the plurality of pixels of the image as identified by the tracking of the shading state and generating of the invocation information and the lineage information.

11. The method of claim 1, further comprising:
determining whether the at least one pixel is a respective anchor pixel based at least on the invocation information of the at least one pixel stored in the invocation buffer;
determining whether the at least one pixel is a respective orphan pixel based at least on the invocation information stored in the invocation buffer and based on the lineage information of the at least one pixel stored in the lineage buffer; and
wherein performing the one or more deferred shading or post-processing operations on the at least one pixel of the plurality of pixels further comprises performing on a subset of the plurality of pixels of the image determined based on the invocation information and the lineage information, wherein the subset of the plurality of pixels includes each anchor pixel and each orphan pixel.

12. A computer device for variable rate shading, comprising:
a memory; and
a graphics processing unit (GPU) in communication with the memory, wherein the GPU is configured to:

rasterize, by a graphics processing unit (GPU), a primitive of an image based on one or more corresponding shading rates, wherein the primitive includes a plurality of pixels;

generate, based on the rasterization, metadata that identifies whether each pixel of the plurality of pixels is one of an anchor pixel, a broadcast pixel, or an orphan pixel, wherein each anchor pixel is a pixel for which a pixel shader was previously invoked, wherein each broadcast pixel includes shading information copied from a referenced anchor pixel, and wherein each orphan pixel includes shading information copied from a previously referenced anchor pixel that was overwritten;

track, by the GPU, a shading state for each pixel of the plurality of pixels based on the metadata by generating invocation information stored in an invocation buffer and lineage information stored in a lineage buffer, wherein the invocation information includes information about the pixel shader to indicate whether a respective pixel is the anchor pixel, wherein the lineage information includes pointer information identifying one of the plurality of pixels from which shading information originated to indicate whether the respective pixel is the broadcast pixel, and wherein a combination of the invocation information and the lineage information indicates whether the respective pixel is the orphan pixel; and perform one or more deferred shading or post-processing operations on at least one pixel of the plurality of pixels of the image based at least in part on the shading state of the at least one pixel as tracked by the invocation information and the lineage information.

13. The computer device of claim 12, wherein the one or more deferred shading or post-processing operations on the image includes a reprojection, a temporal anti-aliasing, a deferred lighting operation, or a combination thereof.

14. The computer device of claim 12, wherein the GPU is further configured to:
perform pixel shading on each anchor pixel and each orphan pixel identified based on the invocation information and the lineage information; and
copy a result of the pixel shading for each broadcast pixel from a corresponding referenced anchor pixel identified in the lineage information.

15. The computer device of claim 14, wherein the GPU is further configured to:
determine that at least one anchor pixel of the primitive is overwritten; and
update the lineage information to identify a respective broadcast pixel as a respective orphan pixel for any broadcast pixel of the primitive pointing to the at least one anchor pixel that is overwritten by performing the pixel shading.

16. The computer device of claim 12, wherein the one or more deferred shading or post-processing operations on the image includes a temporal anti-aliasing, wherein the GPU is further configured to perform the temporal anti-aliasing to:
identify one or more orphan pixels based on the invocation information and the lineage information;
identify whether any of the one or more orphan pixels have a respective valid temporal sample available; and
copy a value of the respective valid temporal sample instead of performing deferred shading on the one or more orphan pixels.

17. The computer device of claim 12, wherein the GPU is further configured to perform the one or more deferred shading or post-processing operations on the image to:
assign a first weight to each anchor pixel, a second weight to each broadcast pixel, and a third weight to each orphan pixel, wherein the first weight is greater than the second weight and the first weight is greater than the third weight, and wherein the first weight, the second weight, and the third weight are assigned based on the invocation information and the lineage information; and
perform the one or more deferred shading or post-processing operations on the image based at least on the first weight, the second weight, and the third weight, wherein the first weight, the second weight, and the third weight are assigned such that a subset of the plurality of pixels are blended with respective temporal samples during temporal anti-aliasing.

18. The computer device of claim 17, wherein the GPU is further configured to:
determine whether the at least one pixel is a respective anchor pixel based at least on the invocation information of the pixel stored in the invocation buffer; or
determine whether the the at least one pixel is a respective orphan pixel based at least on the invocation information stored in the invocation buffer and the lineage information of the pixel stored in the lineage buffer.

19. The computer device of claim 12, wherein the GPU is further configured to:
clear, by the GPU, a render target associated with the plurality of pixels of the image.

20. The computer device of claim 12, wherein a size of the invocation buffer is one bit per pixel and a size of the lineage buffer is two bits per pixel.

21. A computer-readable medium storing computer-executable instructions executable by a processor for variable rate shading, comprising instructions to:
rasterize, by a graphics processing unit (GPU), a primitive of an image based on one or more corresponding shading rates, wherein the primitive includes a plurality of pixels;
generate, based on the rasterization, metadata that identifies whether each pixel of the plurality of pixels is one of an anchor pixel, a broadcast pixel, or an orphan pixel, wherein each anchor pixel is a pixel for which a pixel shader was previously invoked, wherein each broadcast pixel includes shading information copied from a referenced anchor pixel, and wherein each orphan pixel includes shading information copied from a previously referenced anchor pixel that was overwritten;
track, by the GPU, a shading state for each pixel of the plurality of pixels based on the metadata by generating invocation information stored in an invocation buffer and lineage information stored in a lineage buffer, wherein the invocation information includes information about the pixel shader to indicate whether a respective pixel is the anchor pixel, wherein the lineage information includes pointer information identifying one of the plurality of pixels from which shading information originated to indicate whether the respective pixel is the broadcast pixel, and wherein a combination of the invocation information and the lineage information indicates whether the respective pixel is the orphan pixel; and
perform one or more deferred shading or post-processing operations on at least one pixel of the plurality of pixels of the image based at least in part on the shading state of the at least one pixel as tracked by the invocation information and the lineage information.

22. The computer-readable medium of claim 21, wherein the instructions to perform the one or more deferred shading or post-processing operations on the image include instructions to perform a reprojection, a temporal anti-aliasing, a deferred lighting operation, or a combination thereof.

\* \* \* \* \*